United States Patent [19]

Vavřina et al.

[11] 4,101,182
[45] Jul. 18, 1978

[54] HOODS FOR RECORD PLAYERS

[76] Inventors: Josef Vavřina, Steinhofstrasse 9; Benedikt Strausak, Merianweg 19, both of CH-3400 Burgdorf, Switzerland

[21] Appl. No.: 715,390

[22] Filed: Aug. 18, 1976

[30] Foreign Application Priority Data

Aug. 20, 1975 [DE] Fed. Rep. of Germany ....... 2537085

[51] Int. Cl.² .......................................... A47B 81/06
[52] U.S. Cl. .......................................... 312/8; 312/14; 248/460; 211/41
[58] Field of Search ............... 312/282, 284, 198, 196, 312/231, 208, 8-14; 211/40, 41; 248/454, 441, 442.2, 460

[56] References Cited

U.S. PATENT DOCUMENTS

| 513,113 | 1/1894 | Kelly | 248/441 |
|---|---|---|---|
| 742,395 | 10/1903 | Colleen | 248/442.2 |
| 1,230,614 | 6/1917 | Stechbart | 312/8 |
| 1,722,105 | 7/1929 | Mitchell | 312/14 |
| 1,722,105 | 7/1929 | Mitchell | 312/14 |
| 1,926,606 | 9/1933 | Ward | 312/10 |
| 1,947,053 | 2/1934 | Mason | 248/460 |
| 2,406,669 | 8/1946 | Daniels | 312/284 |
| 2,547,754 | 4/1951 | Herrick | 312/208 |
| 2,609,636 | 9/1952 | Stone | 248/460 |
| 3,101,568 | 8/1963 | Tratt | 248/441 |
| 3,350,150 | 10/1967 | Schwarm | 248/45 X |
| 3,350,150 | 10/1967 | Schwarm | 248/454 |
| 3,799,488 | 3/1974 | Sena | 248/460 |
| 3,848,944 | 11/1974 | Gilmer, Jr. | 248/460 |
| 3,878,438 | 4/1975 | Weisman | 211/41 |

FOREIGN PATENT DOCUMENTS 132,261  4/1929  Switzerland .......................... 312/8

Primary Examiner—Casmir A. Nunberg
Assistant Examiner—Victor N. Sakran
Attorney, Agent, or Firm—Albert L. Jeffers; John F. Hoffman

[57] ABSTRACT

A record player hood having a pair of raised strips thereon and a pair of stops projecting upwardly from the strips near the side about which the hood pivots so as to prevent record jackets from sliding off the hood when it is raised. A channel is formed in the hood underneath one of the strips and serves to house the electrical cable for a lamp which is mounted to the hood.

1 Claim, 5 Drawing Figures

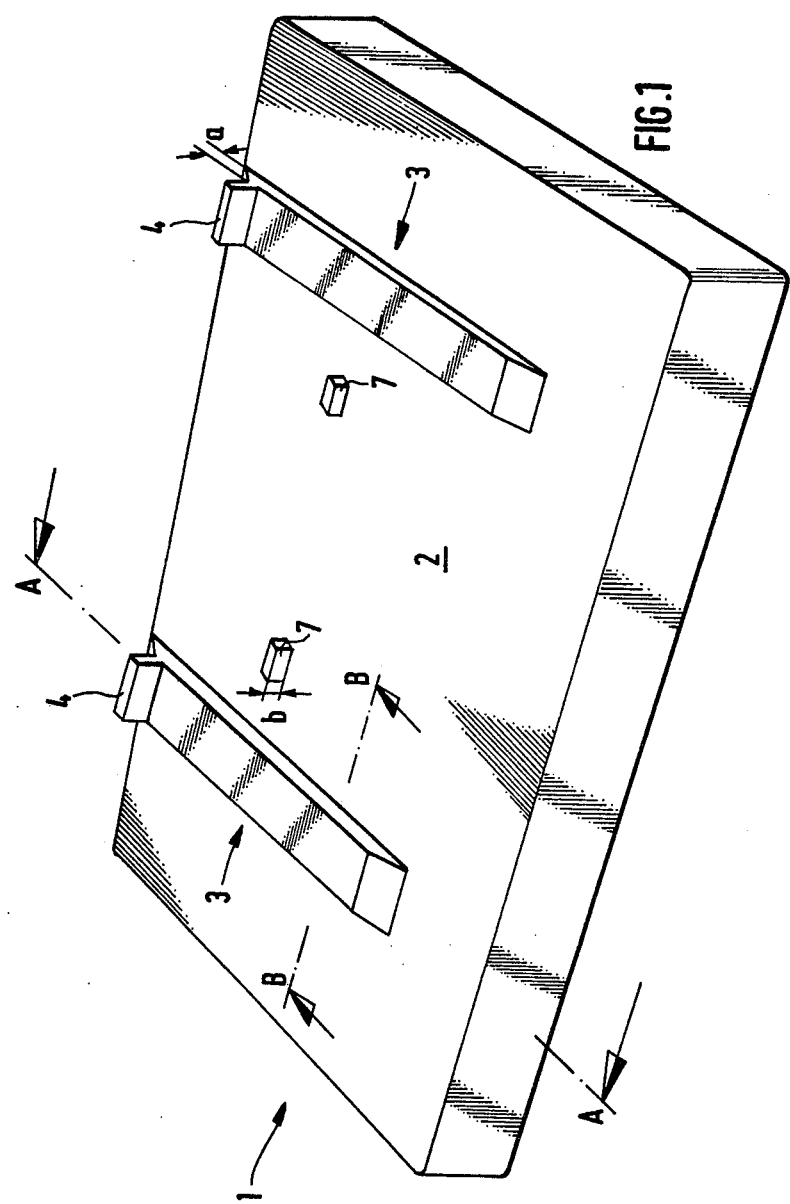

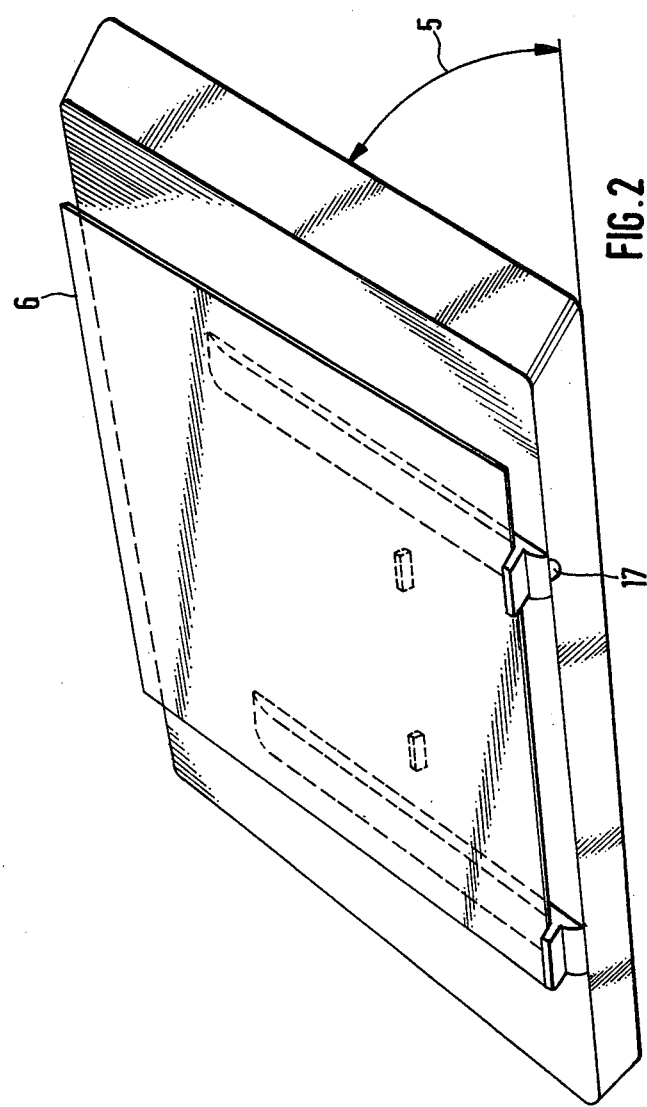

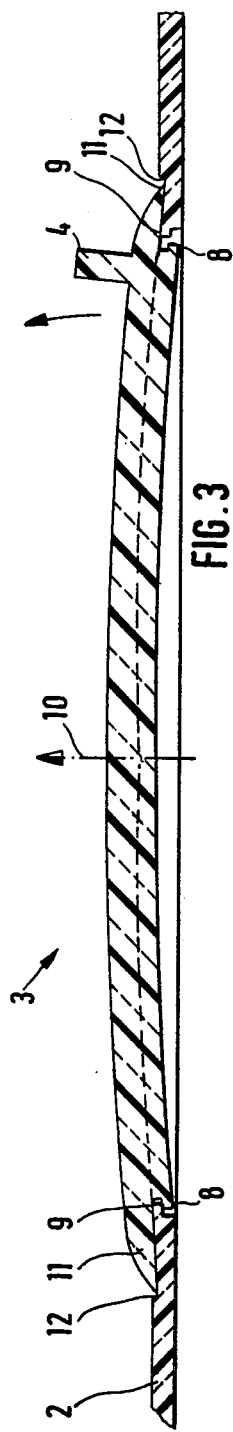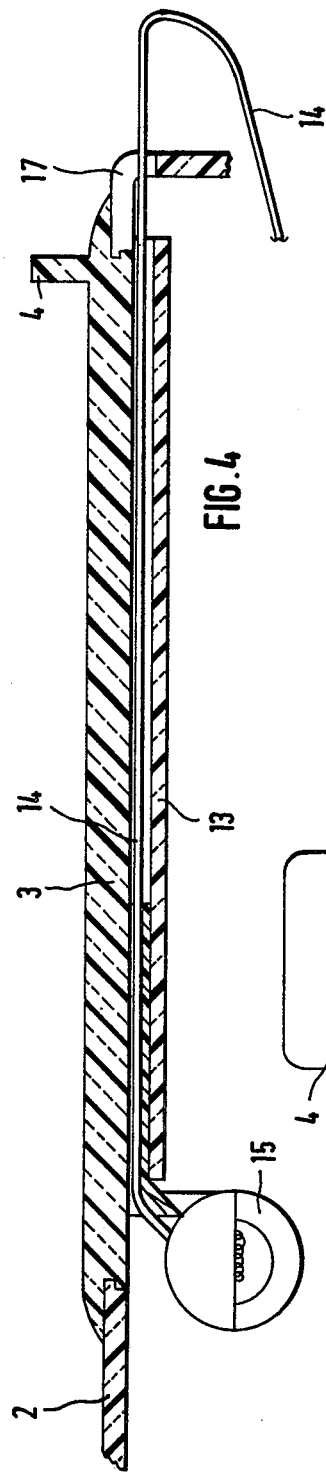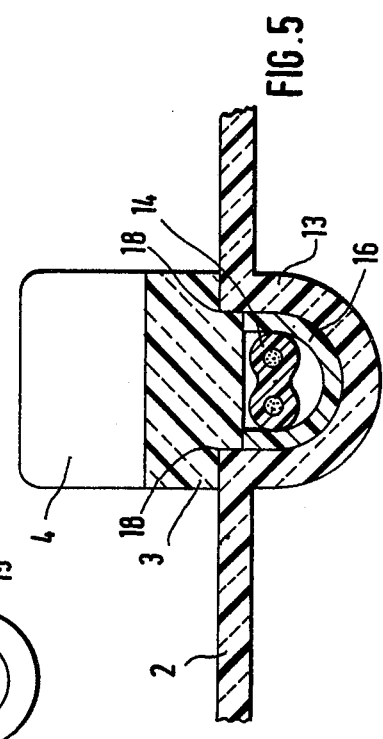

HOODS FOR RECORD PLAYERS

The present invention relates to improvements in hoods for record players.

With known record players, means are provided for the tidy filing of the record sleeve of the record being played. The invention is therefore based on the problem of providing a record player which has a simple filing arrangement for the record sleeves.

For the solution of this problem, the invention is characterized in that there are provided on the upper side of the lid surface of the covering hood strips with stops for the supporting of record sleeves.

The record sleeves need only be placed on the strips so that upon raising of the covering hood, they contact the stops and are thus prevented from sliding off. At the same time, they are spaced a certain distance from the lid surface of the covering hood so that undesirable static charging of the record sleeve via the lid surface of the covering hood is prevented.

The strips - generally two strips will suffice - are at a distance from one another such that large sized record sleeves may be securely placed on them. A third strip may also be provided between these two strips so that smaller record sleeves can be supported. In an alternative embodiment, there are located between the strips, stops for record sleeves of smaller size. It is preferred that the strips be insertable in recesses of the lid surface. Thereby it is possible to form under the lid surface a cable channel for the connecting cable of an electric appliance. Such an electric appliance may be, for example, a lamp with a suitable inclination switch for the purpose of illuminating the space under the covering hood. Upon removal of the strips, the cable channel and cable are freely accessible from above.

In order to provide for the insertion of the strips, they have at both ends nose pieces which contact under tension corresponding shoulders on the front sides of the recess in the lid surface.

The invention will be described with reference to the accompanying drawings wherein:

FIG. 1 is a perspective view of a covering hood seen from above which includes two strips and between the strips, two stops;

FIG. 2 shows the covering hood of FIG. 1 in the raised position with a large sized record sleeve placed thereon;

FIG. 3 is a section on line A—A of Fig. 1;

FIG. 4 is a section of FIG. 3 including a cable channel, an electric lamp with a switch and a connecting cable; and FIG. 5 is a section on line B—B of FIG. 1 with a cable channel and connecting cable disposed therein.

In FIG. 1, a covering hood 1 is shown on the lid surface 2 to which are fixed two strips 3 spaced apart from one another. The strips have on their respective rear ends two upwardly projecting stops 4. Fig. 2 shows that upon pivoting the covering hood 1 through an angle 5, a record sleeve contacts the stops 4.

In the embodiment shown, there are located between the strips 3, upstanding stops 7 made from the material of the lid surface 2 on which smaller record sleeves come into contact. The height of the stops 7 is less than or equal to the height of the strips 3 without their stops 4.

The strips 3 have on their undersides outwardly projecting noses 8 (FIG. 3) with which they lie under tension on corresponding shoulders 9 of the lid surface 2. For the insertion of the strips in longitudinal recesses in the lid surface 2, the strips must therefore be bent slightly upwards in the direction of the arrow 10 as shown in FIG. 3. They then snap fit into their seating.

Furthermore, the strips 3 have above the noses 8 further ends 11 tapering outwards beyond the noses 8 in contact with the shoulders 12 of the lid surface 2. Thus, an optically favorable transition and an additional contact securing means is achieved.

In the embodiment shown in FIGS. 4 and 5, there is located under the lid surface 2 a generally semi-circular profiled cable channel 13 which is formed preferably from the material of the lid surface 2. In cable channel 13, a cable 14 is disposed and leads to a lamp 15. Reference 16 denotes an insert layer or holder. The connection cable 14 is guided out through an opening 17 to the rear side of the covering hood 1.

As shown in FIG. 5, strip 3 also has laterally two shoulders 18 to provide for positioning of the strip in the recess also in the paper plane of FIG. 5.

Instead of the two stops shown, strips similar to strip 3 may also be provided between strips 3. The strips 3 may also be formed integrally with the covering hood with or without the cable channel 13. The whole covering hood including strips is preferably made of transparent synthetic glass.

We claim:

1. A pivoted covering hood for a record player having an upper surface and a rear side about which said hood pivots, the improvement comprising:

a pair of spaced apart strips extending forwardly from said rear side, said strips extending upwardly from the hood upper surface and being dimensioned to support a record sleeve and space the same from said hood upper surface, said hood including openings in said hood upper surface, said strips being recessed in said hood upper surface and snap fit in said openings, and stops disposed respectively on said strips and extending upwardly therefrom, said stops being positioned near said rear side.

* * * * *